United States Patent

[11] 3,568,022

[72] Inventors Helmut Domann
 Stuttgart;
 Gerold Ritz; Erika Ritz, Successor, Tiengen/Hochrhein; Gerold Ritz, Successor, Tiengen; Anna Ritz, Successor, Tiengen, Germany
[21] Appl. No. 782,008
[22] Filed Dec. 6, 1968
[45] Patented Mar. 2, 1971
[73] Assignee Robert Bosch GmbH
 Stuttgart, Germany
[32] Priority Dec. 20, 1967
[33] Switzerland
[31] 18011/67

[54] CONTROL SYSTEM TO CONTROL THE SLIP FREQUENCY OF AN ASYNCHRONOUS DYNAMO ELECTRIC MACHINE
 34 Claims, 16 Drawing Figs.
[52] U.S. Cl. .................................................. 318/231,
 318/227, 318/230, 318/341
[51] Int. Cl. ........................................................ H02p 7/42
[50] Field of Search............................................ 318/227,
 230, 231, 341, 345

[56] References Cited
UNITED STATES PATENTS
| | | | |
|---|---|---|---|
| 3,372,323 | 3/1968 | Guyeska.................... | 318/231X |
| 3,437,900 | 4/1969 | Kennedy..................... | 318/231X |
| 3,453,524 | 7/1969 | Dinger........................ | 318/231X |
| 3,477,002 | 11/1969 | Campbell..................... | 318/227 |

Primary Examiner—Oris L. Rader
Assistant Examiner—Gene Z. Rubinson
Attorney—Stephen H. Frishauf ABSTRACT: A bidirectional counter 34; 46, 47, 49, has input pulses, which have a pulse repetition rate (PRR) proportional to shaft speed connected to a forward count input and pulses from a pulse source having a PRR proportional to the frequency of a power bus of controllable frequency which supplies power to, or absorbs power from the asynchronous dynamo electric machine connected to a reverse count input. One of the pulse repetition rates, applied to the bidirectional counter, is additionally a function of a desired slip frequency. The output of the counter then, over analogue-digital converter and integrating networks 33, 32 controls the frequency of operation of the power bus in accordance with its count state, thereby holding slip frequency and therewith torque at the desired value.

Mot.
$$f_1 = f_n + f_2$$

FIG. 9

Gen.
$$f_1 = f_n - f_2$$

INVENTORS
Helmut DOMANN
Gerold RITZ

By their ATTORNEYS

INVENTORS
Helmut DOMANN
Gerold RITZ

By their ATTORNEYS

CONTROL SYSTEM TO CONTROL THE SLIP FREQUENCY OF AN ASYNCHRONOUS DYNAMO ELECTRIC MACHINE

The present invention relates to an arrangement to control the slip frequency of an asynchronous dynamoelectric machine, which is supplied with power from a source, the frequency of which is controllable, for example over an inverter, or which can feed power into a sink over the same inverter, at a controlled frequency.

Asynchronous machines may operate both as motors or as generators. Upon loading, or upon drive, a slip between the rotor and stator field will develop; in motor operation, the rotor will be at a lower speed than the rotating magnetic field from the stator, while when operating as a generator, the rotating field in the rotor will have a higher speed than the field in the stator. The difference in speed between the actual speed of the rotor, upon loading, and the rotating field in the stator is proportional to the slip frequency arising therebetween. For example, when a 3-phase network having a frequency of 60 Hz. is connected to an asynchronous motor, having a number of pole pairs $p=1$, the rotor field will rotate with a speed of 60 revolutions per second. If, upon loading, the rotor however has a speed of only 59 revolutions per second, a difference in speed of one revolution per second arises and the slip frequency will be 1 Hz.

The slip frequency is an important parameter in the operation of an asynchronous machine. If the magnetic flux is held constant within the air gap between rotor and stator —which requires, with increasing frequency of an energy source, increase in the voltage thereof, —then the torque obtained from the motor is directly proportional to the slip frequency. In other words, the torque obtained from a motor can be controlled by control of the slip frequency, so long as the flux within the air gap is held constant. This relationship holds true both for motor, as well as for generator operation of asynchronous machines.

It has previously been proposed to control the slip frequency of asynchronous machines (see, for example, U.S. Pat. Nos. 1,481,880; 1,481,881; 1,481,882; 2,977,522, particularly FIG. 4; Proceedings IEE, Vol. 111, 1964, pp. 1833—1846). For example, a mechanical differential gearing has been proposed, having as one input a speed proportional to the actual value of the slip frequency, and another input to which a speed proportional to a commanded slip frequency is applied. If the actual value is greater than the commanded value, then the supply voltage to the asynchronous machine is increased. If this is insufficient, then the supply frequency of the asynchronous machine is decreased until the actual value is equal to commanded value.

As will be readily apparent (see for example the above referred to U.S. Pat. No. 1,481,881), it is difficult to construct an arrangement of this kind; this is particularly applicable when the asynchronous machine operates with a squirrel cage rotor. In this case, two additional electrical machines are necessary in order to have available a device turning at a speed proportional to slip frequency. Thus, a large and expensive arrangement is required which reacts only slowly to changes of the slip frequency and is not particularly useful for drives of high variations in loading, or for drives operating at high speeds.

It is an object of the present invention to provide an arrangement in which the slip frequency of an asynchronous machine can be automatically controlled to have a desired value rapidly and accurately.

It is a further object of the invention to provide an arrangement for automatically controlling slip frequency, which arrangement is particularly suited for asynchronous machines operating at high rotational speeds.

It is a further object of the invention to provide such an arrangement in which slip frequency can be varied from positive to negative values, i.e. which allows a smooth transition from motor operation to generator operation of the asynchronous machine and vice versa.

It is still a further object of the invention to provide such an arrangement further embodying an automatic speed control.

It is still a further object of the invention to provide such a system, either with or without automatic speed control, to be used for a prime mover system for a vehicle.

It is a further object of the invention to provide such a system which is employing digital control elements, as well as an inverter system for providing AC energy of variable frequency to the asynchronous machine, and which is insensitive to stray pulses emanating from the inverter system.

Subject matter of the present invention: A control circuit is provided which contains a bidirectional digital counter, for example a forward-backward counter. One input to the counter has pulses applied thereto having a pulse repetition rate (PRR) per unit time which is dependent at least on the frequency of energy of a controllable frequency, applied to, or derived from a bus; the other counter input, for counting in the opposite direction, has pulses applied thereto having a PRR proportional at least to shaft speed of the asynchronous machine. The pulse repetition rate of one of the pulse sequences or pulse trains is additionally dependent on the desired slip frequency. The count within the counter is then applied over a digital-analogue converter and a subsequent integrating amplifier to a controller which controls the frequency of the energy at the bus.

The inputs to the counter will thus, automatically, have pulse trains applied thereto each having equal PRR's if the machine operates in steady state condition, resulting in a substantially steady state count within the counter, varying, or hunting about a value of zero. The relative repetition rates of the pulse trains will satisfy, in steady state conditions, a certain mathematical relationship. By suitable choice of this relationship, a frequency can be generated which is, almost instantaneously, equal to the sum (or difference) of two other frequencies. The arrangement is substantially insensitive to noise and stray pulses, which can be suppressed only with difficulties when inverter arrangements having high harmonic contents are used. The accuracy of a digital arrangement is achieved while using a counter having only low counting capacity.

The source of energy for the asynchronous machine, forming a power bus, is preferably a controlled inverter, the frequency of operation of which is controllable. The output voltage of the integrator stage, from the analogue digital converter, can thus be applied to an oscillator having a voltage-controlled frequency, this frequency then controlling the frequency appearing at the power bus. The frequency of the oscillator can be equal to the frequency of the inverter, or it may be a multiple thereof, to be later divided by frequency divider stages to that of the operating frequency of the inverter.

If it is desired to operate the asynchronous dynamoelectric machine as a motor, as well as a generator, then, preferably, the control network is so arranged that a pulse train is used as a command value for the desired slip frequency, which pulse train has a PRR changing approximately linearly upon switch-over between generator and motor operation. Preferably, the PRR is so set that it is larger than zero even at the highest slip frequency still permitted within the design limits of the control system. The result will be that the pulse train, serving as a command parameter, is shifted with respect to the actual slip frequency (or a corresponding multiple thereof) by a constant factor, in positive direction. In order to compensate for this shift, the PRR of the pulse train independent of the slip frequency is likewise increased by a predetermined number of pulses per unit of time, that is the frequency of the other pulse train is likewise shifted by a corresponding value in the positive direction. Both these shifts are mutually compensating.

The structure, organization, and operation of the invention will now be described more specifically with reference to the accompanying drawings, wherein.

In the description to follow, similar parts, and parts having the same function will be referred to with the same reference numerals throughout.

Figure 1:
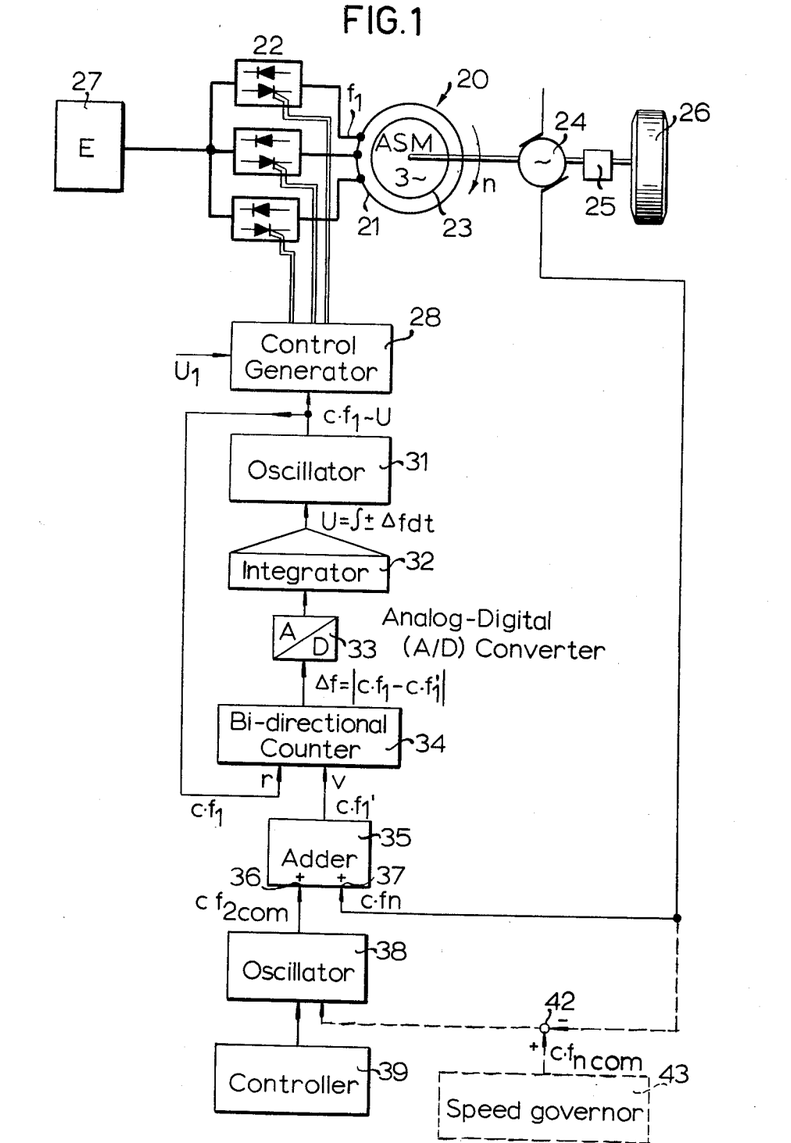
FIG. 1 is a schematic diagram of an arrangement in accordance with the present invention.

An asynchronous dynamoelectric machine 20, having a stator 21 is connected to the output of a controlled inverter 22, the frequency of operation of which is controllable. Inverter 22 provides alternating current to asynchronous machine 20, 3-phase as indicated. Rotor 23 of the machine 20 rotates with a speed $n$, which is variable. The shaft of the machine is connected to a tachometer generator 24, which provides pulses of a frequency $c \cdot f_n$, for example for each rotation of rotor 23, 60 or 120 pulses. The asynchronous dynamoelectric machine 20 drives, for example, a vehicle wheel 26 over a transmission 25.

Inverter 22 is connected to a source E, such as the battery of a vehicle, as at 27 or, for example, to a 3-phase power supply having a rectifier connected thereto. Inverter 22 is controlled from a control generator 28 which provides control pulses to inverter 22, shifted by 120° (electrically) with respect to each other. The frequency of operation of control generator 28 will be synchronous with a control frequency $c \cdot f_1$ and further depends on a selectable voltage $U_1$. The voltage $U_1$ increases with increasing frequency in order to have a constant flux $\Phi_L$ within the air gap of the machine 20.

Figures 10, 11:
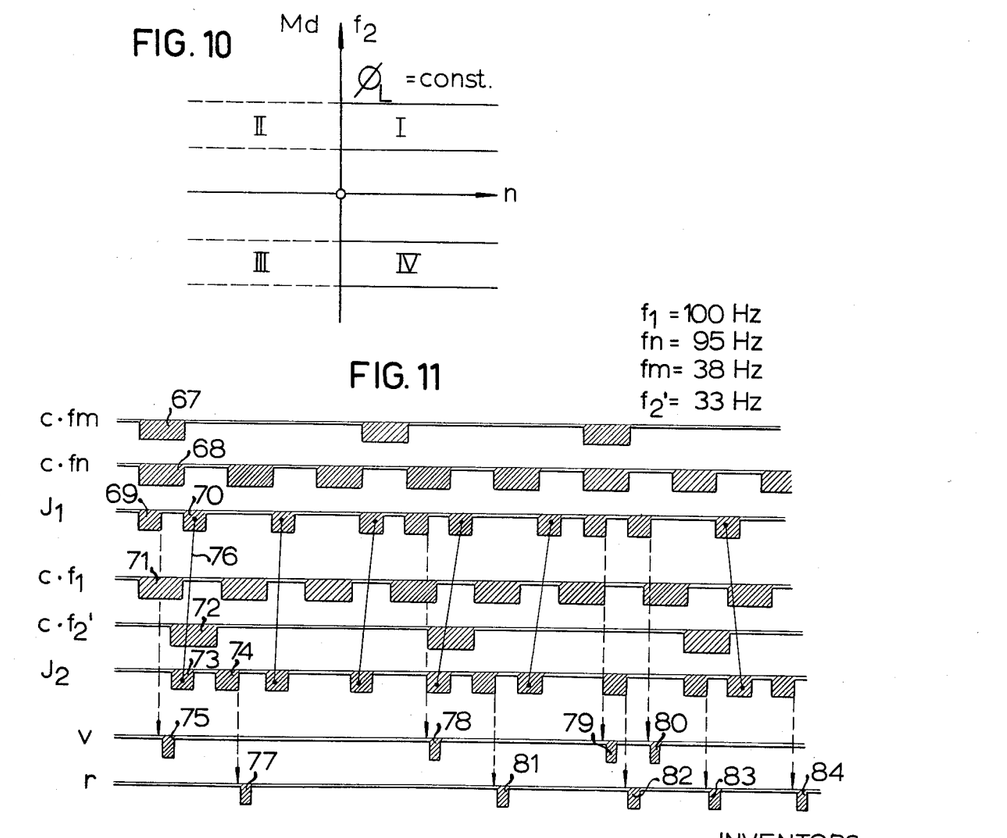
FIG. 10 illustrates frequency versus speed relationships arising in the operation of the control system.
FIGS. 11, 12, and 13 are pulse and timing diagrams to illustrate the operation of the circuits in accordance with the preceding FIGS.

As shown in FIG. 1, asynchronous machine 20 may, or may not have sliprings. Neglecting losses, and when operating under no-load conditions, the speed of rotation of the machine 20 is proportional to the preset control frequency $c \cdot f_1$. If, for example, frequency $f_1$ of the output voltage of the inverter 22 is 100 Hz., and asynchronous machine 20 has a single pair of poles, $p = 1$, then the no-load speed, $n$, will be 6000 r.p.m. If, however, resistance is transferred from wheel 26, for example when the vehicle meets an upgrade, then the speed of machine 20 will drop, for example to 5820 r.p.m. Rotor 23 will than have a potential induced therein varying at a certain frequency, in the present instance of 3 Hz. This, of course, is the well-known slip frequency and in the present application will be referred to as $f_2$. If the magnetic flux in the air gap of machine 20 is constant, then the slip frequency will be directly proportional to the torque $M_d$ of the machine 20. In other words, when the slip frequency $f_2$ is set, the output torque $M_d$ (FIG. 10) can also be preset for any speed of rotation $n$. This relationship is indicated in FIG. 10. Quadrants I and II illustrate operation of machine 20 as a motor; the lower quadrants III and IV illustrate operation as a generator. The delivered, or absorbed torque can, in all four quadrants, be preset by suitable adjustment of the slip frequency $f_2$. Similarly, and using a closed control loop based on torque, the speed of the motor can be preset or controlled —in the forward direction (quadrants I and IV) and in backward direction (quadrants II and III).

The present invention is based on this known principle.

Control generator 28 and inverter 22 are not described in detail, since they may readily be constructed from conventional parts, well-known in the current supply field. Inverter 22 preferably includes silicon controlled rectifier SCR elements, which provide high output frequencies at low power losses. Control generator 28 includes frequency division stages in order to obtain control pulses of frequency $f_1$ from the higher frequency $c \cdot f_1$. The voltage applied to asynchronous machine 20 can be changed in a well-known manner. Inverter 22 can readily be designed to supply energy from source 27 to machine 20 (for motor operation: quadrants I and II in FIG. 10) as well as deliver energy from machine 20 back to energy source 27, for example upon braking, or a downhill run of the vehicle (generator operation: quadrants III and IV in FIG. 10). Inverters and control generators are conventional units, see for example the above referred to reference "Westinghouse Engineer," Jul. 1, 1961, pp. 123—126, "Adjustable frequency AC Drive System with Static Inverter."

The input of control generator 28, which controls the firing electrodes of inverter 22, is connected to the outputs of an oscillator 31. Oscillator 31 generates a wave having a frequency $c \cdot f_1$, the frequency of which is proportional to an input voltage U.

Voltage U is delivered by an integrator 32, an element common in analogue amplifier circuits. The output voltage U is proportional to the integral of the input voltage with respect to time.

Analogue/digital converter (A/D) 33 supplies its output to the input of integrator 32. The output of A/D converter is an analogue voltage representative of the digital input thereto.

A bidirectional counter 34, capable of counting forward and backward, has its output connected to A/D converter 33. The bidirectional counter has two inputs: one, $v$ for forward count, and one, $r$ for reverse count in the opposite direction. Bidirectional counters are frequently used in digital systems; a simple coded counter, operating in pure binary code is suitable for the purposes of the present invention.

Counter input $r$ is supplied with an output frequency $c \cdot f_1$ of oscillator 31. Counter input $v$ is supplied with a pulse train having a PRR $c \cdot f_1'$ derived from an adder stage 35. The number of pulses obtained from adder stage 35 during one second is $c \cdot f_1'$, which pulses are not, however, necessarily equally distributed in time. The construction of adder stage 35 is described in detail in connection with FIGS. 4 and 5.

Adder stage 35 has a pair of inputs 36, 37. Input 36 has the output frequency $c \cdot f_{2\ com}$ applied thereto, which frequency is derived from an oscillator 38, and determined by a command generator 39 which, for example, may be operated by the speed control, for example the accelerator, of the vehicle, the wheel 26 of which is schematically indicated. In the alternative, the commanded frequency of output 38 can be derived from a comparator 42 which forms part of a closed speed regulating loop, to control the speed $n$ of machine 20. The second input of adder network 37 has the output frequency $c \cdot f_n$ of the tachometer generator 24 applied thereto. If a closed control loop is provided, then the output frequency $c \cdot f_n$ is further supplied as an actual value to one input of the comparator 42, the other input to which is determined by a value applied by a speed control regulator 43 having an output value $c \cdot f_{n\ com}$. Such a speed control, which may be in the form of a governor, is particularly applicable if the vehicle is to be used as a public service or municipal vehicle having a predetermined maximum speed. If the output frequency from comparator 42, that is $c \cdot (f_{n\ com} - f_n)$ is generated digitally, then this frequency can be applied directly to the input 36 of adder network 35. If, however, this output value is in analogue form, for example in form of a current, or a voltage, then this analogue value is used to control the frequency of oscillator 38.

Figure 8:
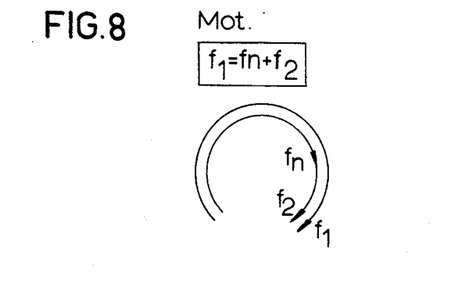
FIGS. 8 and 9 illustrate frequency relationships arising in the motor and generator operation.

Operation of the system according to FIG. 1: Let it be assumed that asynchronous machine 20 has a pair of poles of number $p = 1$, and is supplied with a frequency $f_1$ of 100 Hz.; that it operates in steady state; and that the shaft speed $n =$ 5820 r.p.m., resulting in the slip frequency $f_2 = 3$ Hz., and a rotor frequency of $f_n = 97$ Hz. As seen in FIG. 8, under these operating conditions $f_1 = f_n + f_2$.

Let if further be assumed that factor $c = 6$, so that the input connection $r$ of counter 34 will have 600 pulses per second applied thereto, and input connection $v$ will likewise have 600 pulses per second applied thereto. The input to $v$ is derived from 582 pulses from tachometer generator 24 and 18 pulses derived from oscillator 38 which, by controller 39, is set to a frequency of 18 Hz. The number of pulses from tachometer generator 24 are derived by $p \cdot c \cdot$ shaft speed in seconds, that is $1 \cdot 6 \cdot 97$.

Counter 34 thus has 600 pulses applied thereto in a forward direction and 600 pulses in a backward direction so that the state of the counter will be around the value of zero. As a result, D/A converter 33 will provide an output potential of about zero, so that the output potential U of integrator 32 will have essentially no change but remain at its steady state value, which corresponds to a frequency of $c \cdot f_1 = 600$ Hz. Wheel 26 will thus be driven with constant torque at constant speed.

This condition will change when, for example, the vehicle of which the system is a part rolls downhill. Speed increases, and thus the speed of rotation $n$, changes, so that the value of $c \cdot f_n$ now, for example, will reach 595 pulses per second. Adding thereto the 18 pulses per second from oscillator 38, will result in $595 + 18 = 613$ pulses per second appearing at the input $v$ of counter 34. The input $r$ will, however, continue to have initially only 600 pulses per second. The counting state of counter 34 will thus rise by a difference $\Delta f$, resulting in a change in the output voltage at D/A converter 33. This changed voltage is integrated in integrator 32, and increases the output voltage U until the frequency $c \cdot f_1$ has also reached 613 pulses per second. A new steady state condition will result, and the count in counter 34 will again go to zero. The frequency $c \cdot f_1$ is thus so regulated that it is always equal to the sum of the frequencies $c \cdot f_{2\ com}$ and $c \cdot f_n$. In other words, the relationship illustrated in FIG. 8 is again satisfied, and the slip frequency $f_2$ has been regulated, although it has not, directly, ever been measured.

The construction of counter 34 will be described in detail in connection with FIG. 2. It requires only a few counting stages for example $2^4 - 1$ or $2^5 - 1$, in both directions (positive and negative). When the counter has reached the highest value, for example 31, then this count is held until counting pulses in the reverse direction are applied to its input. Thus, during a regulating cycle, the following count conditions may occur: 1, 2, ... 30, 31, 31, 31, ...(although further pulses may arrive) ...31, 31, 30 ... 2, 1, 0, −1, −2, −1, 0, +1, 0, etc. When the counter has state "31," then the output potential of the D/A converter 33 has a value which is sufficiently great such that integrator 32 increases its output potential U rapidly.

The polarity of the output potential of the D/A converter 33 changes sign when the counting state of counter 34 goes negative. For example, if the polarity of the output potential of A/D converter 33 was positive when the counter counted in the positive direction, then, when the counter reaches a negative state, the polarity of the output potential of A/D converter will likewise become negative. The highest number which the counter can count is also held in the negative direction; in other words, the zero position of the counter is intermediate its counting range.

If, after steady state, the vehicle is braked, the above described operation will occur, but in reverse, with respect to the description in connection with acceleration. If, for example, vehicle wheel 26 is retarded, speed $n$ will reduce, for example, to 5760 r.p.m., so that $c \cdot f_n = 576$ Hz. Input $v$ to bidirectional counter 34 will thus have 594 pulses applied thereto per second $(576 + 18)$, although input $r$ will, initially, have 600 pulses per second applied. The count condition of counter 34 will thus become negative by a difference $\Delta f$, and the polarity of the output potential of D/A converter 33 will reverse, so that the output potential U of integrator 32 will decrease, thus causing frequency $c \cdot f_1$ also to decrease until it has reached the same pulse count per second as that applied to the input $v$ of counter 34, in this case 594 pulses per second. Then the state of counter 34 will again revert to zero, the output potential U of integrator 32 will continue to maintain the value it has then reached.

If, for example, one of the inputs $v$ or $r$ of counter 34 have undesired noise pulses applied thereto, only a very short term disturbance of equilibrium will result. This disturbance is immediately regulated out; this is one of the substantial advantages of the system in accordance with the present invention since inverter arrangements, and particularly inverter arrangements using SCR's are subject to noise pulses.

The accuracy of integrator 32 and oscillator 31 need not be very great —an additional advantage of the present invention —since the closed control loop from oscillator 31 to counter 34 will, in all instances always control to the desired result. Integrator 32 and oscillator 31 must be designed merely to enable the maximum permitted frequency $c \cdot f_1$ (corresponding to maximum permitted speed $n$) to be obtained at the highest output potential U. In order to prevent runaway of dynamoelectric machine 20, if the load is removed, a voltage limiter may be provided.

Figure 9:
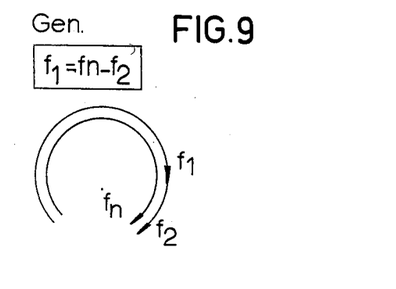
Figure 14:
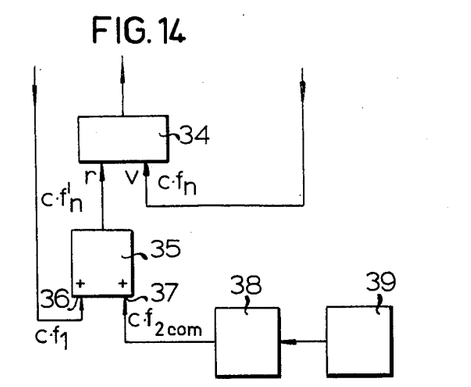
FIG. 14 is a different embodiment of part of the circuit of FIG. 1, particularly adapted for generator operation.

The embodiment of the invention described in accordance with FIG. 1 can be used with the dynamoelectric machine 20 operating as a motor only since, as seen in FIGS. 8 and 9, the slip frequency will change its vector direction upon change from motor to generator operation. Since, however, negative frequencies are not possible, oscillator 38 cannot command generator operation. Rather, as illustrated in FIG. 14 for generator operation, adder stage 35 must be switched over so that input 36 will have frequency $c \cdot f_1$ applied thereto and input 37 the desired slip frequency $c \cdot f_{2\ com}$. The pulse train $c \cdot f_n'$ is then applied to the input of counter 34, the other input to the counter having the frequency $c \cdot f_n$ applied thereto. In all other respects, the circuit can be the same as that of FIG. 1.

The circuit in accordance with FIG. 14 then satisfies the relationship illustrated in FIG. 9 and controls the slip in generator operation, that is $f_1 + f_{2\ com} - f_n = 0$.

Figures 2, 3:
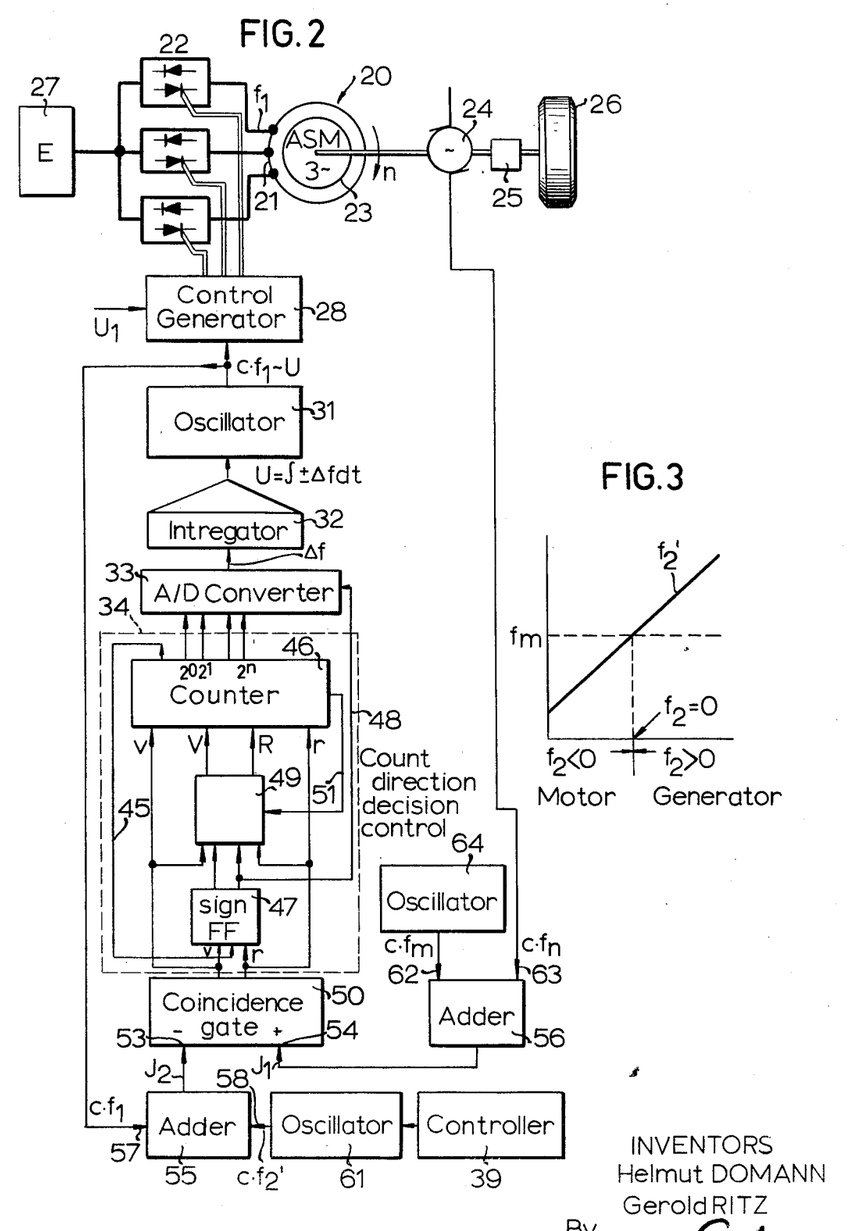
FIG. 2 is a similar schematic diagram, illustrating a different embodiment.
FIG. 3 is a graph of frequency relationships for use in connection with the explanation of FIG. 2.

FIG. 2 illustrates a development of the circuit in accordance with FIG. 1, enabling both motor operation as well as generator operation, and smooth transition from one mode to the other. Since the circuit, in many respects, is similar to that of FIG. 1, similar parts will not be described again and have been given the same reference numerals. The bidirectional counter is, however, illustrated in greater detail. It includes a counter stage 46, assembled, for example, in known manner from bistable flip-flops, and counting pulses in a direction dependent on signals applied to terminals V and R.

Signals V and R are generated in stage 49, which may be termed a counting-direction-decision stage. The output of stage 49 depends on the state of a sign flip-flop 47, the state of which will depend on a characteristic of the pulses $v$ and $r$. A line 45 interconnects the output of the counter stage 46 and flip-flop 47. Line 45 is connected to indicate when the counting stage 46 is in the count stage ZERO. If subsequent to state zero, a forward counting impulse in applied at terminal $v$, sign flip-flop 47 will indicate a positive count. If, however, following count state zero, a backward counting impulse at terminal $r$ is applied, sign flip-flop 47 will indicate a negative count stage, and, simultaneously, switch the polarity of the output potential of the D/A converter 33 over a line 48. Count state zero, itself, does not result in a change of the sign.

Figure 12:
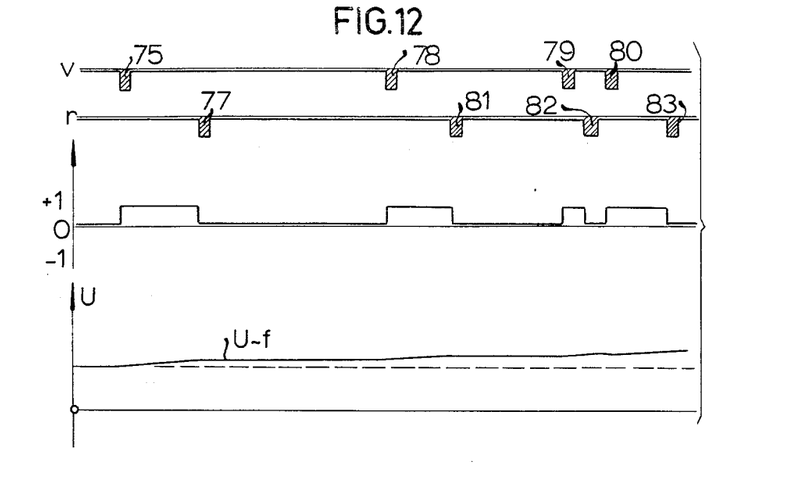

Two sets of information pulses are applied to the input of stage 49 determining the direction of counting: For one, the output signal of sign flip-flop 47, and for the other information regarding the characteristics of applied pulses, namely whether the pulses are for count terminal $v$ or for count terminal $r$. FIG. 12 indicates, in the first two rows, such pulses. Each pulse has a leading edge and a trailing edge. The leading edge controls the stage 49, whereas the trailing edge controls count stage 46.

For example, in operation (starting from a counter state of +1):

TABLE I

| Input pulse to terminal | Output from— 47 | Output from— 49 | Count state in 46 |
|---|---|---|---|
| v | + |   | +1 |
| v | + | V | +2 |
| r | + | R | +1 |
| r | + | R | +0 |
| v | + | V | +1 |
| r | + | R | +0 |
| r | − | V | −1 |
| v | − | R | −0 |
| r | − | V | −1 |

As seen from the above table, the output signal of stage 49 is newly generated by each pulse, from the leading edge thereof. If the count state of the counter is positive [+0 to +(($2^n$−1))], then the leading edge of a pulse v will generate signal V, and the trailing edge of the pulse will be counted forward. If, however, the counter state is negative [−0 to −($2^n$−1)], then such count impulse will cause the signal R and the pulses will be counted backward, that is in the reverse direction to the direction of count for forward pulses.

The reverse is true for signals at input r; if the counter is in a positive state, signals will cause signal R and are counted backward; if the counter state is, however, negative, the pulses will cause a signal V and will be counted forwardly, that is increasing the state of the counter. Such counters are useful not only in connection with the present invention, but independently also in connection with shift registers.

The counter stage 46 counts, as above described, only up to the highest possible counting state of the counter. This, also, can be achieved by use of signals V and R. If, for example, count stage 46 has reached its highest possible count, then this information is applied to stage 49 over a line 51. Signal V is thereby suppressed, so that only such pulses can influence count stage 46 which decrease its counting state; pulses tending to cause further forward count of the counter are no longer applied to the counting stages to be counted.

Since the two inputs v and r of the bidirectional counter comprising stages 46, 47, 49, frequently will have pulses applied thereto almost simultaneously, such counter must be designed for a very high counting frequency, for example 2 MHz., in order to obtain correct counts. In operation of the system, forward pulses and backward pulses may be applied simultaneously, or almost simultaneously.

In order to eliminate simultaneous, or almost simultaneous pulses tending to cause the counter to count in opposite directions, which will not cause any change in the counting state, a coincidence gate 50 is interposed between pulses applied to sign flip-flop 47 and the source of pulses therefor. The circuit, and operation of coincidence gate 50 will be described in detail in connection with FIGS. 6 and 7. Its action is to suppress all pulse pairs between inputs 53 and 54 which have a time overlap, that is time coincidence. Stage 50 thus passes only those pulses which have a time gap from a pulse at the other input, which gap has at least the value zero. Simultaneously, the output pulses applied from gate 50 are of shorter time duration than the input pulses, thus ensuring a certain minimum distance between pulses and positive, error-free operation of the counter. This enables design of the stages 46, 47, 49 of the counter assembly for a substantially lower maximum operating frequency than would be otherwise required.

Input 53 of coincidence gate 50 is connected to the output of an adder stage 55; input 54 is connected to the output of an adder stage 56. Adders 55 and 56 are similar to the adder stage 35, described in connection with FIG. 1. The adder stages will be described in detail in connection with FIGS. 4 and 5.

Input 57 of adder stage 55 has frequency $c \cdot f_1$ applied thereto and derived from the output of oscillator 31. Input 58 has the output frequency $c \cdot f_2'$ of an oscillator applied thereto which is again controlled from command transducer 39, for example the accelerator of the vehicle.

Adder stage 56 has two inputs, 62, 63. A constant frequency $c \cdot f_m$ of an oscillator 64 is applied to input 62. This frequency determines the transition of asynchronous dynamoelectric machine 20 from motor to generator operation, and vice versa. This frequency may, of course, also be made variable and controllable, for example in order to enable emergency braking or stopping or to account for operating parameters arising in the system for example, if energy source 27 is a battery, the state of charge of this battery; or operating or ambient temperature. Control of the frequency of oscillator 64 to be variable and dependent on a parameter is within the scope of the present invention.

Input 63 of adder stage 56 has the frequency $c \cdot f_n$ derived from tachometer generator 24 applied thereto.

FIG. 3 illustrates the relationship of frequencies $f_2'$ and $f_m$. Frequency $f_2'$, when machine 20 operates the motor, is less than i $f_m$; during synchronous operations, $f_2' = f_m$, and upon generator operation $f_2'$ is greater than $f_m$. The value of $f_m$ itself is, of course, chosen arbitrarily. Since the speed of control of the system increases with increasing frequency, this frequency is selected comparatively high; this has the further advantage that oscillator 64 then requires only small circuit elements. The illustration of the operation in accordance with FIG. 11 shows relatively low frequencies, in order to simplify the representation of the drawing. Frequencies $f_m$ and $f_2'$ may, however, be chosen to be higher than frequencies $f_n$ and $f_1$. This is one of the specific advantages of the arrangement in accordance with FIG. 2.

Operation of the system in accordance with FIG. 2, and referring to the pulse diagram of FIG. 11, for motor operation of dynamoelectric machine 20:

FIG. 11 has been drawn with respect to the steady state operation in which $f_n + f_m - f_2' - f_1 = 0$, for the following values: $f_1 = 100$ Hz.; $n = 5700$ r.p.m. corresponding to $f_n = 95$ Hz.; $f_m = 38$ Hz.; $f_2' = 33$ Hz.

For better illustration, the various pulses are shaded in FIG. 11. The two top rows show pulse trains $c \cdot f_m$ and $c \cdot f_n$. They are added in adder state 56, having at its output an irregular pulse train $J_1$. Two coincident pulses of $c \cdot f_m$ and $c \cdot f_n$ are shown at 67 and 68. In pulse train $J_1$ two subsequent pulses 69 and 70 of shorter pulse duration are shown corresponding thereto.

The fourth and fifth rows illustrate pulse trains $c \cdot f_1$ and $c \cdot f_2'$. These pulse trains are added in adder stage 50, resulting at its output in an irregular pulse train $J_2$. Two overlapping (with respect to time) pulses of $c \cdot f_1$ and $c \cdot f_2'$ are illustrated at 71, 72. In pulse train $J_2$, two subsequent pulses 73 and 74, each of shorter pulse duration correspond to pulses 71, 72.

As seen in FIG. 11, pulse 69 of pulse train $J_1$ does not overlap with any pulse of pulse train $J_2$, so that an output pulse 75 at the output v of coincidence gate 50 is generated. This pulse 75 is also illustrated in the upper row of FIG. 12 (to which reference will be had later). It is applied to counter 46 and increases the state of the counter from, for example, zero to +1.

Pulses 70 and 73 overlap and are suppressed by coincidence gate 50, which is indicated in FIG 11 by line 76. They are thus not counted. Pulse 74 of pulse train $J_2$ does not, however, overlap with a pulse of pulse train $J_1$ and thus a pulse 77 is generated at the output r of coincidence gate 50. It, also, is applied to counter stage 46 and reduces its count again from, for example, +1 to 0.

As illustrated in FIG. 11, row $J_1$ contains 10 pulses and row $J_2$ (sixth row from top) 11 pulses. Of this total of 21 pulses, 12 are suppressed, so that output v will have 4 pulses left, that is 75, 78, 79, 80, and output r 5 pulses, that is 77, 81, 82, 83, 84. If a larger number of pulses would have been shown, the number of pulses at output v would correspond exactly to the number of pulses at output r. With a factor of $c = 6$, the period of time illustrated in FIG. 11 would correspond to approximately 1.3 milliseconds.

As seen from the top row of FIG. 12, pulses 75 to 83 are, by chance, alternative; that is, each pulse from output v is succeeded by a pulse from output r. Thus the count of the counter will always alternate between two values, for example 0 and +1 or −1 and 0. The third row from the top, in FIG. 12, illustrates the case in which the state of the counter always changes between 0 and +1. At counter state +1, integrator 32 receives a small input potential, so that its output voltage U increases. This increase is illustrated in the fourth row from the top of FIG. 12 in greatly exaggerated form. Two subsequent pulses at output $r$ of coincidence gate 50 cause the counter state to jump to −1, cancelling this increase. Since increase and decrease alternate in rapid sequence, the output voltage U, and the frequency $f_1$ is practically constant. Thus, the arrangement with FIG. 2 likewise will provide for a control of slip frequency $f_2$ of dynamoelectric machine 20 which corresponds to the commanded value determined by the command transducer 39, that is the difference $f_m$ and $f_2'$ (see FIG. 3).

Operation as a generator is illustrated briefly in connection with a numerical example. The mathematical relationship $f_n + f_m - f_2' - f_1 = 0$ again governs; let the following values be assumed: $f_n = 100$ Hz. corresponding to $n = 6000$ r.p.m., $f_1 = 95$ Hz., $f_m = 33$ Hz. and $f_2' = 38$ Hz. Under steady state conditions, the representation of FIG. 11 will be valid. Rows of FIG. 11 then should be labeled as follows:

TABLE II
Modification of Fig. 11
Row 1—Instead of c · $f_m$ insert: c · $f_2'$.
Row 2—Instead of c · $f_n$ insert: c · $f_1$.
Row 3—Instead of $J_1$ insert: $J_2$.
Row 4—Instead of c · $f_1$ insert: c · $f_n$.
Row 5—Instead of c · $f_2'$ insert: c · $f_m$.
Row 6—Instead of $J_2$ insert: $J_1$.
Row 7—Instead of v insert: r.
Row 8—Instead of r insert: v.

The relationships previously described with respect to FIG. 11 equally apply. It should be noted that $f_m$ remains the same, regardless whether the machine 20 operates as a motor or as a generator. Frequency $f_m$ is constant, for example 38 Hz. (the first example in connection with FIG. 2) then; in the second example (Table II), frequency $f_2'$ then must be equal to 43 Hz. A graphic representation similar to FIG. 11, for the example in accordance with Table II, would hardly be different from that of FIG. 11, and thus has been omitted. FIG. 12, however, is not applicable for generator operation, in accordance with Table II. Nevertheless, a practically constant frequency $f_1$ will result having only small variation of short cyclical periods.

Figure 13:
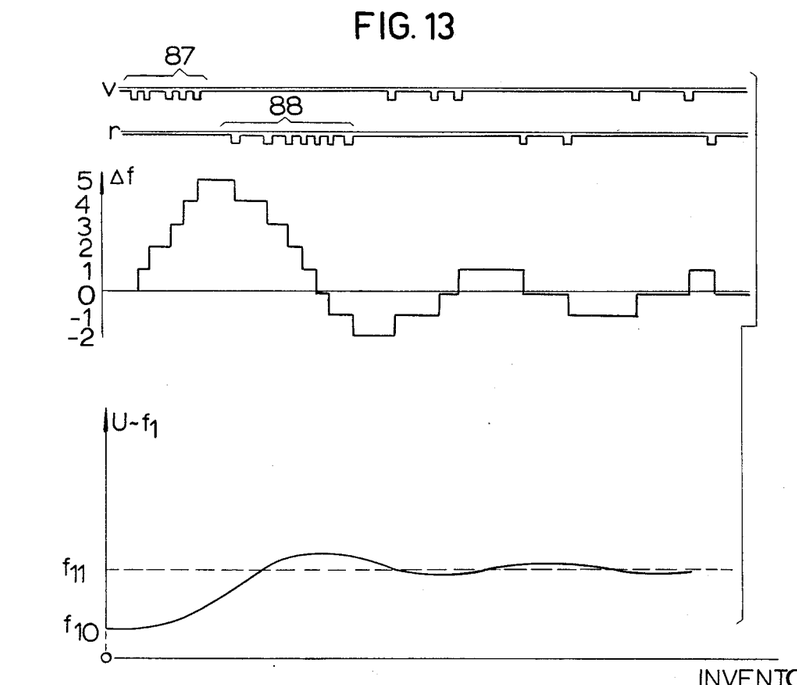

FIG. 13, which is drawn to a different time scale (for a longer time duration) as FIG. 12, illustrates operation under acceleration in accordance with FIG. 2, frequency $f_1$ increasing from a first steady state value $f_{10}$ to a second steady state value $f_{11}$.

The upper row of FIG. 13 illustrates pulses at the output $v$ from coincidence gate 50; the second row from top the pulses from output $r$ of coincidence gate 50. The third row then illustrates the potential at the output of the A/D converter 33 and the fourth row the potential U at the output of integrator 32, directly proportional to the frequency $f_1$.

The output $v$ first has five pulses 87 applied thereto, which bring the count of counter stage 46 to a count of +5, and cause a corresponding increase in the output potential of the A/D converter 33. Thus, potential U increases, as shown, and with it frequency $f_1$. Then follow 7 pulses 88 at output $r$, which bring the state of the counter first to 0 and then to −2. Line 47 causes A/D converter to switch to negative polarity, so that its output voltage will become negative as illustrated in the third row of FIG. 13. Voltage U at the output of integrator 32 is again reduced and approaches its steady state value, corresponding to frequency $f_{11}$. The further pulses at the outputs $v$ and $r$, being essentially symmetrical, further cause establishment of a stable state about a value corresponding to frequency $f_{11}$.

The various steps of the output of the A/D converter 33 can also be made to result in different output voltages, for example a count of 1 may correspond to a voltage of 0.1 v., a count of 2 to a voltage of 0.3 v., a count of 3 to a voltage of 0.6 v. and a count of 4 to a voltage of 0.9 v. Such an arrangement tends to increase the stability in steady state operation since it is similar to a rate feedback arrangement. In the example shown in FIG. 13, all increases of output voltage are the same.

Figure 6:
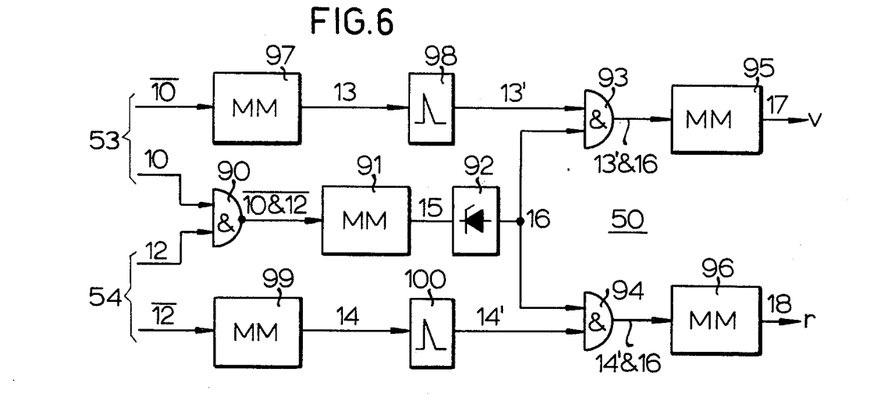
FIG. 6 is a circuit to suppress overlapping pulses of a pair of pulse trains.

FIG. 6 illustrates the circuit of coincidence gate 50. The function of this circuit is to suppress pulses of a pair of simultaneously arriving pulse trains, which at least partially overlap, that is pulses that present time-coincidence. Such a circuit suppresses all pulses having coincident arrival, as illustrated in connection with the graph of FIG. 7.

Coincidence gate 50 has two inputs 53, 54 and two outputs $v$ and $r$. Input 53 has pulse train 10, and its inverse $\overline{10}$ applied thereto; input 54 has pulse train 12 and its inverse $\overline{12}$ applied. The pulses are illustrated shaded in FIG. 7, their inverse blank. The notation 0 corresponds to absence of signal, and the notation L corresponds to "line active," that is presence of a pulse or signal, and generally corresponding to a "1" in the binary system.

Figure 7:
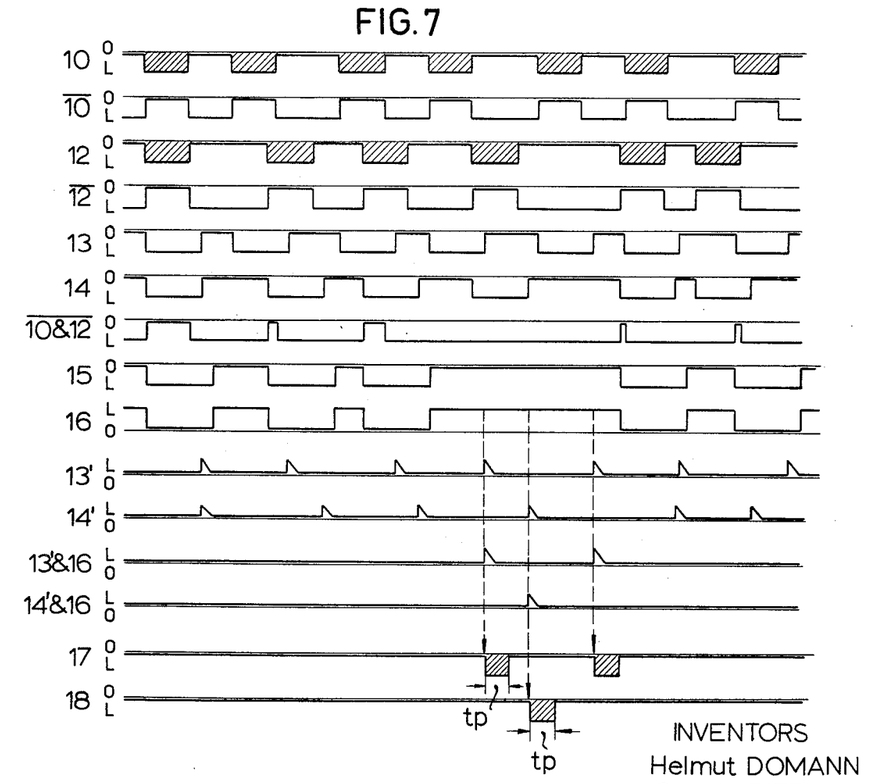
FIG. 7 is a timing diagram to illustrate the operation of the circuit of FIG. 6.

An AND-gate 90 having an inverse output generates a pulse train $\overline{10 \& 12}$ from pulses 10 and 12, as illustrated in FIG. 7. The leading edge of pulses $\overline{10 \& 12}$ trigger a monostable multivibrator 91, having at its output time extended pulses 15, voltage shifted by a bias stage 92 about a predetermined potential, thus producing a pulse train 16 (FIG. 7). The operation of the bias stage 92 will be obvious from a comparison of pulse trains 15 and 16 in FIG. 7. Pulse train 16 is applied to the inputs of a pair of AND-gates 93, 94, the outputs of which are applied, each, to a monostable multivibrator 95, 96, respectively, and having a short pulse duration $t_p$ (with respect to the duration of the pulses 10 and 12). The output of multivibrator 95 serves as the $v$ output of coincidence gate 50, supplying pulses 17. The output of multivibrator 96 is the $r$ output of coincidence gate 50, delivering pulses 18.

The inverse pulses $\overline{10}$ (second row of FIG. 7) trigger, with their trailing edge, a monostable multivibrator 97. Its output pulses 13 are slightly longer than the pulses 10 and are in phase with it. The trailing edges of pulses 13 are differentiated in a differentiator network 98 and result in needle or peak pulses 13′, applied to the second input of AND-gate 93. The inverse pulses $\overline{12}$ (fourth row, FIG. 7) trigger, with their trailing edges, monostable multivibrator 99, having output pulses 14 slightly longer than pulses 12 and in phase with them. The trailing edges of pulses 14 are differentiated in a differentiator network 100 and result in needle or peak pulses 14′, applied as a second input to AND-gate 94.

The signal at the output of bias stage 92 is an information signal serving to determine that no coincidence of pulses is present. Needle pulses 13′ or 14′ can trigger multivibrators 95 or 96 only when and if signal 16 has enabled AND-gates 93, 94, in order that an output impulse 17 or 18 is generated.

FIG. 7 illustrates in the first row pulse train 10, 7 pulses and in the third row, pulse train 12, 6 pulses. These, 13 pulses total, have 10 coincident pulses, so that output $v$ delivers only 2 pulses 17 and output $r$ only one pulse 18. As will be obvious, similar results are obtained in other cases of coincidence since, upon coincidence of any kind, with respect to time, of 2 pulses, both are suppressed.

The circuit in accordance with FIG. 6 may, or course, be used also with different arrangements than the control system of FIG. 2, as well as in different positions; for example, it may be used ahead of the inputs to counter 34 in the arrangement according to FIGS. 1 and 14.

Figure 4:
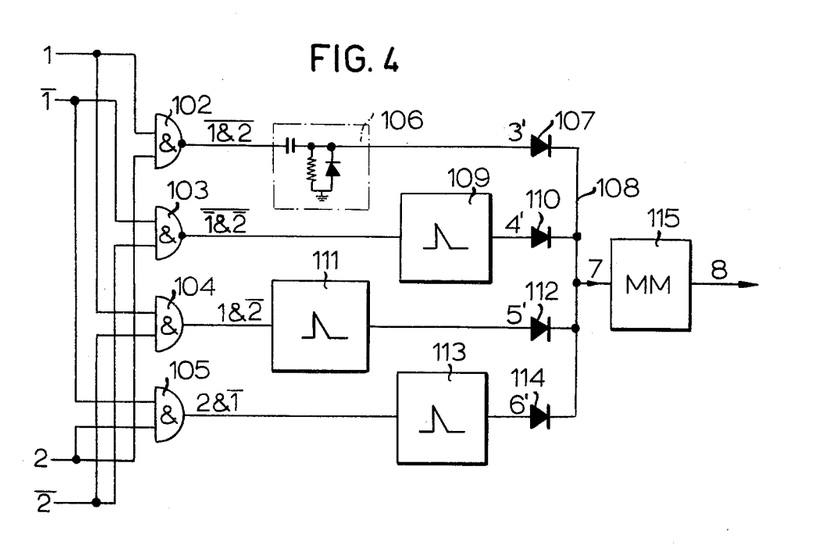
FIG. 4 is an adder network for continuous addition of two pulse trains, applied at terminals 1, 1, 2, 2, and having an output at 8.
Figure 15:
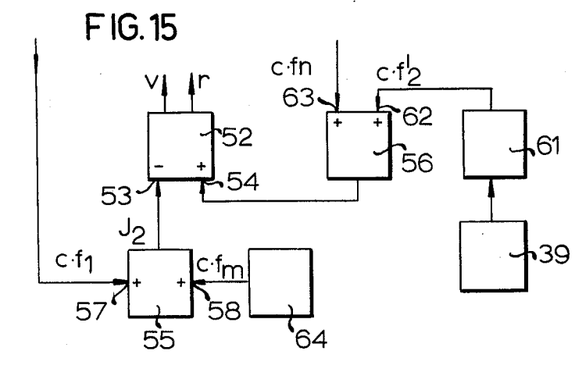
FIG. 15 is a different embodiment of part of the circuit of FIG. 2.

FIG. 4 is a circuit diagram of an adder stage, for example adder stage 35 of FIGS. 1 and 14, or adder stages 55, 56 of FIGS. 2 and 15. The input signals are 1 and $\overline{1}$ and 2 and $\overline{2}$ illustrated in the first four rows of FIG. 5. Again, pulses derived from inputs 1 and 2 are shaded for ease of presentation.

A pair of AND-gates 102, 103, having inverted output, and a pair of AND-gates 104, 105 form the input to the adder. AND-gate 102 has signals 1 and 2 applied thereto, so that the output will be a signal $\overline{1 \& 2}$, the trailing edge of which is differentiated in a differentiating network 106, resulting in a needle, or sharply peaked pulse 3′, applied over a diode 107 to a common bus 108.

The two inputs of AND-gate 103 have the signals $\bar{1}$ and $\bar{2}$ applied, so that at its output a signal $\bar{1}$ & $\bar{2}$ is derived, the trailing edge of which is differentiated in a differentiating network 109, resulting in a needle pulse 4' applied over diode 110 to bus 108.

The two inputs of AND-gate 104 have signals 1 and $\bar{2}$ applied, so that its output will be a signal (1 & $\bar{2}$), the trailing edge of which is differentiated in differentiating network 111, resulting in a needle pulse 5', applied over diode 112 to bus 108.

The two inputs of AND-gate 105 have signals $\bar{1}$ and 2 applied thereto, so that at its output a signal ($\bar{1}$ & 2) is derived, the trailing edge of which is differentiated in differentiating network 113, resulting in a needle pulse 6', and applied over a diode 114 to bus 108.

Figure 5:
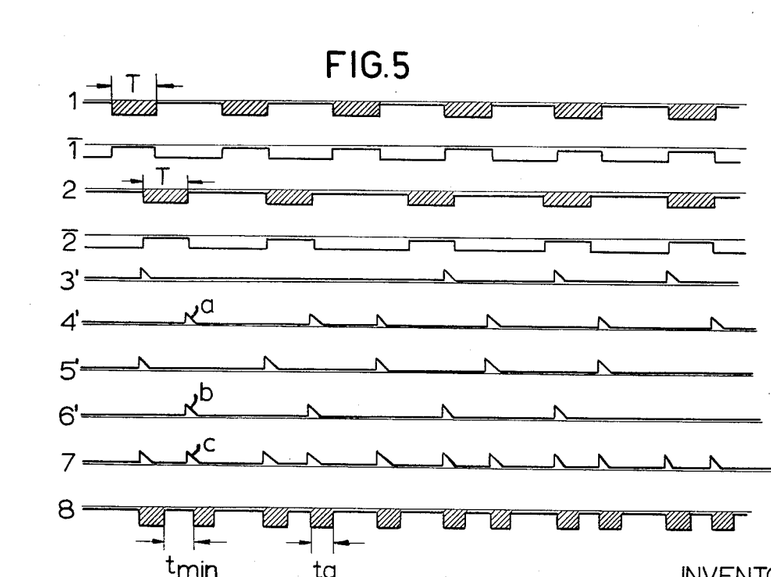
FIG. 5 is a pulse diagram to illustrate operation of the circuit of FIG. 4.

Bus 108 thus has all needle pulses 3', 4', 5' and 6' applied, which are superimposed to a common pulse train 7 (FIG. 5). If several needle pulses are coincident, for example in FIG. 5 the pulses designated $a$ and $b$ of pulse trains 4' and 6', then a single output pulse will result, indicated here with $c$ of pulse train 7.

Bus 108 is connected to the input of a monostable multivibrator 115, the impulse duration $t_q$ (FIG. 5) of which is shorter than the impulse duration of the input pulses. When the duration of input pulses 1 and 2 is equal, and further equal to T (FIG. 5) then, with a desired minimum pulse distance $t_{min}$ at the output of multivibrator 115 the relationship: $T = t_q + t_{min}$ must obtain. The pulse train or sequence 7 triggers multivibrator 115, so that its output will have a pulse train 8 (last row of FIG. 5). The number of pulses per unit time is equal to the number of pulses of pulse trains 1 and 2 in the same unit of time. For example, if the pulse train 1 in FIG. 5 has 6 pulses and pulse train 2 has 5 pulses, pulse train 8 will have 11 shorter pulses, separated from each other by a minimum time lapse $t_{min}$.

Figure 16:
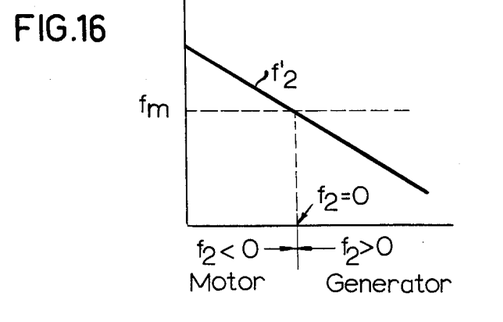
FIG. 16 is a graph illustrating frequency relationships useful in connection with the explanation of the operation of the circuit of FIG. 15.

FIG. 15 illustrates how the circuit in accordance with FIG. 2 may be varied, a portion only being shown. The remaining parts of the circuit of FIG. 2 will be identical. Input 58 of adder stage 55 has the frequency derived from oscillator 64, $c \cdot f_m$ applied thereto. An oscillator 61, having its frequency of oscillation $c \cdot f_2'$ controlled by controller 39 is connected to terminal 62 of adder stage 56. The frequency $c \cdot f_m$ from oscillator 64 is, again, constant or may be varied to compensate for operating parameters. FIG. 16 illustrates the frequency $f_2'$ dependent from the slip frequency $f_2$. Upon change of mode of the operation of the system, that is from motor to generator, $f_2'$ decreases. Upon synchronism ($f_2 = 0$) $f_2'$ will be equal to the frequency $f_m$. As a comparison of FIG. 3 and FIG. 16 will show, the frequency curves of $f_2'$ are, for the embodiments in accordance with FIGS. 2 and 15, each other's mirror images.

The arrangement in accordance with FIG. 15 has the same mode of operation as that of FIG. 2, and the relationships for synchronism, that is for $f_2' = f_m$ are identical, as an inspection of the circuits will show.

The diagram of FIG. 11 may also be used to illustrate the operation in accordance with FIG. 15. In case of generator mode of operation, and utilizing the following operating parameters: $f_n = 100$ Hz.; $f_2' = 33$ Hz.; $f_m = 38$ Hz.; $f_1 = 95$ Hz., will have the following significance:

TABLE III

Row 1—Same.
Row 2—Instead of $c \cdot f_n$ insert $c \cdot f_1$.
Row 3—Instead of $J_1$ insert $J_2$.
Row 4—Instead of $c \cdot f_1$ insert $c \cdot f_n$.
Row 5—Same.
Row 6—Instead of $J_2$ insert $J_1$.
Row 7—Instead of $v$ insert $r$.
Row 8—Instead of $r$ insert $v$.

The explanation previously given with respect to FIG. 11 applies, equally, in the present case. For motor operation, the following parameters will result: $f_n = 95$ Hz.; $f_2' = 43$ Hz.; $f_m = 38$ Hz.; $f_1 = 100$ Hz. Of course, $f_m$ will remain constant for generator, as well as for motor mode of operation.

Control of speed can be arranged in the embodiment of FIGS. 2 and 15 similarly as described in detail in connection with FIG. 1.

The present invention thus enables rapid control of slip frequency, and thus torque of an asynchronous dynamoelectric machine, providing high accuracy by utilizing digital counting techniques.

The present invention has been illustrated in connection with the control of slip frequency of a motor to drive a vehicle, such as, for example, a public utility, public service or municipal service vehicle; various changes and modifications may be made to control the slip frequency of any dynamoelectric machine, for any use, within the inventive concept. For example, in the present description, a 3-phase machine has been described. The multiplication factor $c$ is, in such a case, preferably $6 \cdot x$, wherein $x$ is a whole integer of the series 1, 2, 3, .... . The choice of the integer itself will depend on design considerations, weight and availability of equipment and components.

We claim:

1. Control system to control the slip frequency of an asynchronous dynamoelectric machine 20, said machine being adapted to be connected to a power bus 22 capable of supplying, or absorbing electrical energy at a controllable frequency ($f_1$), said control system comprising:
    a bidirectional digital counter 34; 46, 47, 49, said counter having a forward count input $v$ and a backward count input $r$;
    means 28 to generate a first pulse train of a pulse repetition rate being a function of said controllable frequency, and being connected to one of said inputs to apply the pulses of said first pulse train thereto;
    means to generate a second pulse train of a pulse repetition rate being a function of shaft speed $n$ of the machine and being connected to the other of said inputs to apply the pulses of said second pulse train thereto;
    means 39 connected to one of said pulse generating means to control the repetition rate of one of said pulse trains to be additionally a function of the desired slip frequency; and
    means 33, 31, 28 connected to said counter and responsive to the count thereof controlling the frequency of said power bus.

2. System according to claim 1 wherein said means to control the frequency of said power bus includes means 33 deriving an analogue output proportional to the count of said counter 34 and means responsive to said analogue output and including an integrating amplifier 32, connected to said power bus and controlling the frequency thereof.

3. System according to claim 2 wherein said means responsive to said analogue output includes an oscillator 31 connected to said integrating amplifier, said oscillator having a frequency of oscillation $c \cdot f_1$ controlled by the output of said integrating amplifier, said oscillator controlling the frequency $f_1$ at said power bus.

4. System according to claim 1 having means FIG. 2, 15: 39, 61 generating pulses of a repetition rate $c \cdot f_2'$ preset to be proportional to the desired slip frequency; and said means to control the pulse repetition rate of one of said pulse trains is effective to increase the PRR of said one pulse train as a function of the PRR ($c \cdot f_2'$) of the pulses derived from said pulse generating means.

5. System according to claim 4 wherein the pulse repetition rate of the pulses derived from said pulse generating means 39, 61 — $c \cdot f_2'$ changes substantially linearly during changeover of the dynamoelectric machine from motor to generator mode of operation.

6. System according to claim 4 wherein the pulse repetition rate $c \cdot f_2'$ of said pulse generating means for permitted operating conditions and slip frequencies of the machine, is preset to be always greater than zero.

7. System according to claim 1 wherein the pulse repetition rate PRR of the input not additionally a function of the desired slip frequency has its rate increased by a predetermined number of pulses per unit time $c \cdot f_m$.

8. System according to claim 5 wherein the PRR of the input not additionally a function of the desired slip frequency has its rate increased by a predetermined number of pulses per unit time $c \cdot f_m$, said number of pulses per unit time $c \cdot f_m$ being equal to the number of pulses per unit time provided by said pulse generating means 39, 61 when set for a desired slip frequency of zero.

9. System according to claim 1 further including a coincidence gate FIG. 2, 50 connected to have said first pulse train and said second pulse train applied thereto, and having its output connected to said counter 46, 47, 49, said coincidence gate suppressing overlapping pulses FIGS. 2, 6, 7, 15.

10. System according to claim 1 wherein said control system operates at a pulse repetition rate increased by a predetermined factor $c$ over the frequencies occurring in said machine.

11. System according to claim 10, said system controlling a 3-phase machine, wherein said predetermined factor is a factor of 6. $x$, wherein $x$ is a whole integer of the series 1, 2, 3, .....

12. System according to claim 1 including means providing pulses having a repetition rate which is a function of the pulse repetition rates of separate pulse trains, each applied to an input, said means comprising an adding network FIG. 1: 35; FIG. 2: 55, 56; FIGS. 4, 5 having one separate pulse train of a first repetition rate and a separate pulse train of a second repetition rate, per unit time, applied thereto, said adding network having an output having a pulse repetition rate in the same unit of time formed of the sum of the pulses of said first and said second pulse train per unit time.

13. System according to claim 12, wherein two adding stages 55, 56 are provided:
a. one of said adding stages 55 having pulses of a repetition rate representative of the frequency appearing at said bus $c \cdot f_1$;
b. pulses of a repetition rate representative of desired slip frequency $c \cdot f_2$ applied thereto;
c. the other adder stage 56 having pulses $c \cdot f_n$ representative of shaft speed $n$ of the machine; and
d. pulses of a repetition rate of a predetermined frequency $c \cdot f_m$ corresponding to the PRR representative of desired slip frequency when the slip frequency is zero FIGS. 3 & 13, applied thereto the pulses $J_1$ derived from the output of one adder stage 55 being applied 50–47–49 to the count input $v$ of said counter 46 for counting in one direction, and the pulses $J_2$ derived from the output of said other adder stage 56 being connected to the other input $r$ of said counter for counting in the opposite direction FIGS. 2, 3, 11, and 12.

14. System according to claim 13 including a coincidence gate 50 connected to have output pulse trains $J_1$, $J_2$ of said adder stages 55, 56 applied thereto, said coincidence gate being connected to said counter and suppressing pulses from both said adder networks which arrive simultaneously.

15. System according to claim 1 including:
a coincident pulse suppression gate FIG. 2: 50; FIGS. 6 & 7 interconnecting said pulse trains and said inputs $v$, $r$ of the counter 34; 46, said gate 50 having a pulse train applied each to a respective input 53, 54;
means extending in time, separately, the pulses derived from both said inputs $\overline{10}$, $\overline{12}$;
logic means 99 having said pulses 10, 12 applied thereto and having an output signal $\overline{10}$ & $\overline{12}$ forming the logical conjunction of the presence of one of said signals only and indicative of no time-overlap of signals;
a first monostable multivibrator 91 triggered by the output from said logic means and providing an output information signal 16 of a time duration longer than said input pulses;
conjunctive gates 93, 94 having the trailing edges 13', 14' of said time-extended pulses, as well as the information signal 16 applied thereto; and
an output multivibrator 95, 96 connected to be triggered by the output from said conjunctive gates 93, 94 to provide a pulse only when said first monostable multivibrator 91 has no pulse, and simultaneously the trailing edge of a time-extended pulse is present.

16. System according to claim 12 wherein said adding means add, continuously, pulses of a first pulse train and of a second pulse train, the number of pulses per unit time at the output of the adder corresponding to the total number of pulses, per unit time, of said first and second pulse trains, said network comprising logic means generating four signals:
a. a first signal, being present when the negative conjunction of input signals corresponding to both said pulse trains is present;
b. the second signal being present when the logical conjunction of the pulse trains of both input signals is present;
c. a third signal when logical conjunction of presence of an input signal from the first pulse train and no input signal of the second pulse train is present;
d. a fourth signal when the logical conjunction of an input signal of said second pulse train and absence of a signal from the first pulse train is present; and
e. output generating means responsive to the trailing edges of said four signals FIGS. 4 and 5.

17. System according to claim 16, said output generating means including a monostable flip-flop having a pulse duration time $t_p$ being less by a predetermined desired value $t_{min}$ than the pulse duration T of the input pulses applied to said adder network, said predetermined value corresponding to a desired minimum time gap between successive pulses from said adder network.

18. System according to claim 1, said counter having a predetermined number of counting stages and holding the maximum count in either direction, if a greater number of pulses is applied that stages are provided.

19. System according to claim 18, said counter having means sensing the highest counting stage holding a count and means blocking application of additional pulses for control of said counter when the highest counting stage has been reached.

20. System according to claim 1, said counter having an output terminal supplying a pulse when the count in the counter passes zero and means controlling said control means for the frequency at said power bus to reverse the polarity of an operating parameter within said control means upon change in count in said counter between negative and positive counts.

21. System according to claim 20 wherein said control means for the frequency at said power bus includes a digital digital-analogue converter, the pulse from said counter upon change between positive and negative regions of said counter controlling the polarity of the output of said digital-analogue converter.

22. System according to claim 1 wherein said power bus includes a controlled rectifier-type inverter having an AC output of said controllable frequency, and means supplying DC power to said controlled rectifier-type inverter.

23. System according to claim 1, further including control means to set a desired slip frequency.

24. System according to claim 23, wherein said control means to set the desired slip frequency includes settable operating means 39 and a pulse generator 38, 61 having an output frequency $c \cdot f_{2\,com}$ determined by said operating means.

25. System according to claim 1 including a control loop interconnected with said control system and means deriving pulses representative of speed of said dynamoelectric machine; said control loop regulating the speed of operation of said machine in said system 42, 43.

26. Control system to control the slip frequency of an asynchronous dynamoelectric machine, which machine is adapted to be connected to a power bus capable of supplying, or absorbing electrical energy at a controllable frequency $f_1$ said system comprising:

first means 28 generating pulses at a count per unit time representative of, and controlling said controllable frequency;

second means 24 generating pulses at a count per unit time representative of shaft speed $n$ of the machine;

third means 39, 38 generating pulses at a count per unit time representative of desired slip frequency $cf_{2com}$; $cf_2'$;

means 35 adding the pulses per unit time of said desired slip frequency to the pulses generated in one of said first or second pulse generating means to derive a pulse train having a composite count per unit time of pulses;

a bidirectional counter 34 having pulses of the other of said first or second pulse generating means, and said derived pulse train applied to input terminals to count pulses applied to said input terminals in opposite direction, whereby when the pulses applied to said input terminals alternate, the count in the counter will oscillate about the count of zero; and output means 32, 31 controlled by said counter and providing a control signal representative of the state of count therein to modify the count per unit time of the pulses of said first means, and thus the frequency of said controllable frequency.

27. System according to claim 26 wherein said adding means 35 is connected to said second and third means FIG. 1.

28. System according to claim 26 wherein said adding means is connected to said first and third means FIG. 2.

29. System according to claim 26 including means 64, 56 adding pulses of a predetermined count per unit time $cf_m$ to the pulses derived from said second means 24 to provide for smooth transition between motor and generator mode of operation.

30. System according to claim 26 further including a coincidence gate 50 having the output of the other of said first or second pulse generating means, and said derived pulses applied thereto, said coincidence gate suppressing pulses which have a time overlap to prevent simultaneous application of pulses tending to cause said bidirectional counter to count in opposite directions.

31. System according to claim 26 wherein said output means includes integrating means integrating the state of said counter over a period of time.

32. Method of controlling, by digital counts, the slip frequency of asynchronous machines comprising:

deriving a first pulse train having a count per unit time representative of frequency of a power source, or sink, connected to said asynchronous machine;

deriving a second pulse train $cf_n$ having a count per unit time representative of the speed of the machine;

generating a third pulse train having a count per unit time representative of desired slip frequency ($cf_{2com}$; $cf_2'$); adding pulses of said third pulse train to one of said first or second pulse trains to obtain a composite pulse train;

counting the pulses of the other of said first or second pulse trains in a first direction, and counting said composite pulse trains, in opposite algebraic direction to the first direction;

storing a count representative of said number of pulses, whereby pulses of the other of said first or second pulse trains will set the counter to a value in one direction and a subsequent pulse from said composite pulse train will reset the counter in the opposite direction;

deriving an output signal representative of the number of pulses stored at any time; and modifying the frequency of the power source, or sink by said output signal.

33. Method according to claim 32 including the step of generating a fourth pulse train of a predetermined count per unit time and adding said fourth pulse train $cf_m$ to the pulses of said second pulse train.

34. System according to claim 1 including:

a coincident pulse suppression gate (FIG. 2: 50; FIGS. 6 & 7 interconnecting said pulse trains and said inputs $v, r$ of the counter 34; 46, said gate 50 having a pulse train applied each to a respective input 53, 54;

means extending in time, separately, the pulses derived from said inputs $\overline{10}, \overline{12}$;

logic means 90 having said pulses 10, 12 applied thereto and having an output signal $\overline{10 \& 12}$ forming the logical conjunction of the presence of one of said signals only and indicative of no time-overlap of signals;

a first monostable multivibrator 91 triggered by the output from said logic means and providing an output information signal 16 of a time duration longer than said input pulses;

conjunctive gates 93, 94 having the trailing edges 13', 14' of said time-extended pulses, as well as the information signal 16 applied thereto; and output pulse generating circuits 95, 96, connected each, to a conjunctive gate, said output pulse generating circuits being activated by said conjunctive gates to provide a pulse if and only if said first monostable multivibrator has no pulse, and simultaneously the trailing edge of a time-extended pulse is present.